US008422371B2

(12) United States Patent
Shinbo et al.

(10) Patent No.: US 8,422,371 B2
(45) Date of Patent: Apr. 16, 2013

(54) INFORMATION COLLECTION DEVICE, COMMUNICATION ERROR DETECTION DEVICE, AND COMPUTER PROGRAM

(75) Inventors: Hiroyuki Shinbo, Fujimino (JP); Satoshi Komorita, Fujimino (JP); Hideyuki Koto, Fujimino (JP)

(73) Assignee: KDDI Corporation, Tokyo (JP)

( * ) Notice: Subject to any disclaimer, the term of this patent is extended or adjusted under 35 U.S.C. 154(b) by 294 days.

(21) Appl. No.: 12/676,280

(22) PCT Filed: Sep. 2, 2008

(86) PCT No.: PCT/JP2008/065748
§ 371 (c)(1),
(2), (4) Date: Mar. 3, 2010

(87) PCT Pub. No.: WO2009/031527
PCT Pub. Date: Mar. 12, 2009

(65) Prior Publication Data
US 2010/0172261 A1 Jul. 8, 2010

(30) Foreign Application Priority Data

Sep. 4, 2007 (JP) ................................ 2007-229295

(51) Int. Cl.
*G01R 31/08* (2006.01)
(52) U.S. Cl.
USPC ............................ 370/235; 370/392; 713/201
(58) Field of Classification Search .................. 370/235, 370/392; 713/201
See application file for complete search history.

(56) References Cited

U.S. PATENT DOCUMENTS

| 6,321,338 | B1* | 11/2001 | Porras et al. | ..................... 726/25 |
| 2003/0226034 | A1* | 12/2003 | Howard et al. | ............... 713/201 |
| 2004/0257469 | A1* | 12/2004 | Compton et al. | ............. 348/500 |
| 2006/0067232 | A1* | 3/2006 | Lee et al. | ..................... 370/235 |

FOREIGN PATENT DOCUMENTS

| JP | 200565294 A | 3/2005 |
| JP | 2005094361 A | 4/2005 |
| JP | 2005203992 A | 7/2005 |
| JP | 2006-235876 A | 9/2006 |
| JP | 2007-116516 A | 5/2007 |
| JP | 2008-193482 A | 8/2008 |

OTHER PUBLICATIONS

Cisco SCE 2000 Series-Cisco Systems—[online]. Cisco Systems, Inc. [retrieved on Aug. 8, 2007]. Retrieved from the Internet: URL:http://www.cisco.com/japanese/warp/public/3/jp/product/hs/sce/sce2000/index.shtml.
Keisuke Takemori et al. "Modeling Techniques about Statistical Theory of Attack Events" The Institute of Electronics, Information and Communication Engineers, Technical Report of IEICE. NS2003-286, IN2003-241(Mar. 2004).
Japanese Office Action (Application No. 2007-229295), dated Aug. 7, 2012, with English translation.

* cited by examiner

*Primary Examiner* — Yemane Mesfin
*Assistant Examiner* — Wanda Z Russell
(74) *Attorney, Agent, or Firm* — Morgan, Lewis & Bockius LLP

(57) ABSTRACT

An information collection device includes a signaling packet analysis section which extracts communication device information from a signaling packet, the communication device information identifying a communication device that transmits the signaling packet when connecting to another device.

4 Claims, 13 Drawing Sheets

IP(Internet Protocol)

| Version | IHL | Type of Service | Total Length |
|---|---|---|---|
| Identification | | Flags | Fragment Offset |
| Time to Live | Protocol | | Header Checksum |
| Source Address | | | |
| Destination Address | | | |

UDP (User Datagram Protocol)

| Source Port | Destination Port |
|---|---|
| Length | Checksum |

Mobile IP (Registration Request)

| Type(1) | S | B | D | M | G | r | T | x | Lifetime |
|---|---|---|---|---|---|---|---|---|---|
| Home Address | | | | | | | | | |
| Home Agent | | | | | | | | | |
| Care-of Address | | | | | | | | | |
| Identification | | | | | | | | | |

Mobile Node NAI Extension

| Type(131) | Length | MN-NAI ... |
|---|---|---|

IP (Internet Protocol)

| Version | IHL | Type of Service | Total Length |
|---|---|---|---|
| Identification | | Flags | Fragment Offset |
| Time to Live | Protocol | | Header Checksum |
| Source Address | | | |
| Destination Address | | | |

UDP (User Datagram Protocol)

| Source Port | Destination Port |
|---|---|
| Length | Checksum |

RADIUS (Access Request)

| Code (1) | Identifier | Length |
|---|---|---|
| Request Authenticator | | |

AVP: Calling Station ID

| Type (31) | Length | String ... |
|---|---|---|

AVP: User-Name

| Type (1) | Length | String ... |
|---|---|---|

```
INVITE sip:bob@biloxi.com SIP/2.0
Via: SIP/2.0/UDP pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: application/sdp
Content-Length: 142
```

IP (Internet Protocol)

| Version | IHL | Type of Service | Total Length |
|---|---|---|---|
| Identification | | Flags | Fragment Offset |
| Time to Live | Protocol | | Header Checksum |
| Source Address | | | |
| Destination Address | | | |

UDP (User Datagram Protocol)

| Source Port | Destination Port |
|---|---|
| Length | Checksum |

DNS (Domain Name System)

```
                      1 1 1 1 1 1
 0 1 2 3 4 5 6 7 8 9 0 1 2 3 4 5
```

| ID | | | | | | |
|---|---|---|---|---|---|---|
| QR | Opcode | AA | TC | RD | RA | Z | RCODE |
| QDCOUNT ||||||||
| ANCOUNT ||||||||
| NSCOUNT ||||||||
| ARCOUNT ||||||||
| QNAME ||||||||
| QTYPE ||||||||
| QCLASS ||||||||

INFORMATION COLLECTION DEVICE, COMMUNICATION ERROR DETECTION DEVICE, AND COMPUTER PROGRAM

TECHNICAL FIELD

The present invention relates to an information collection device, a communication error detection device, and a computer program which collect information which is used to determine whether a network has an error or not.

Priority is claimed on Japanese Patent Application No. 2007-229295, filed Sep. 4, 2007, the content of which is incorporated herein by reference.

BACKGROUND ART

FIG. 20 is a view illustrating the configuration of a general communication provider network. Referring to FIG. 20, the general communication provider network includes base stations 171, servers 172, routers 173, and modems 174, and is connected to another communication provider network. In addition, each of the base stations 171 is connected with mobile phones 175 via wireless communication. As shown in FIG. 20, the communication provider network is constructed with a plurality of communication devices such as the base stations 171, the servers 172, the routers 173, and the like, which are connected to each other. As a method for detecting a failure of a communication provider network, there is a method that uses a traffic control unit. In many cases, the traffic control unit can analyze an application protocol such as the Hypertext Transfer Protocol (HTTP) used for Web access, and can additionally perform traffic control in the unit of an Internet Protocol (IP) flow. In addition, the traffic control unit can analyze traffic by the unit of a particular IP flow, which is identified by an IP address or a set of port numbers, by capturing IP packets. Here, the IP address or port numbers are a source or a destination of the IP packets. (See, for example, Non-Patent Document 1.)

Non-Patent Document 1: Cisco SCE 2000 Series-Cisco Systems-[online]. Cisco Systems, Inc. [retrieved on 2007-08-08]. Retrieved from the Internet and incorporated by reference.

DISCLOSURE OF INVENTION

Problem to be Solved by the Invention

However, the traffic control unit is generally expensive since it has to process a massive amount of packets. In addition, since the traffic control unit has to be installed on every communication path supposed to be monitored, in a case of a network such as a communication provider network, which has to monitor a number of communication paths, an extremely high introduction cost becomes unavoidable. Furthermore, the traffic control unit can basically analyze an increase/decrease in the amount of traffic. However, the following are regarded as reasons that cause an increase/decrease in the amount of traffic: (1) traffic increases since a large number of users are accessing the network for some reasons; (2) traffic decreases at, for example, midnight due to a small number of users; (3) traffic decreases since communication cannot be performed due to a failure in the communication provider network; and (4) traffic increases since access terminals reattempt to perform communication due to the failure in the communication provider network. Accordingly, the problem is that it is impossible to understand the reasons for increases and decreases in the amount of traffic simply by monitoring the increase/decrease in the amount of traffic. In other words, it is difficult to determine whether or not a failure is occurring or whether or not the increase/decrease in the amount of traffic is occurring in response to the passage of time merely by monitoring the increase/decrease in the amount of traffic.

The present invention has been devised to resolve the foregoing problems, and therefore an object of the present invention is to provide an information collection device and a communication error detection device that can reduce introduction costs and collect information which a communication error can be more accurately determined when compared to a device that monitors an increase/decrease in the amount of traffic.

Means for Solving the Problem (1) The first aspect of the present invention provides an information collection device that includes a signaling packet analysis section which extracts communication device information from a signaling packet, the communication device information identifying a communication device that transmits the signaling packet when connecting to another device.

(2) In the first aspect of the present invention, the information collection device may further comprise a counting section which counts numbers by which the communication device transmits the signaling packet in a predetermined time, based on the communication device information and a time point extracted by the signaling packet analysis section.

(3) In the first aspect of the present invention, the information collection device may further comprise a counting section which counts a time interval at which the communication device transmits the signaling packet, based on the communication device information and a time point extracted by the signaling packet analysis section.

(4) In the first aspect of the present invention, the information collection device may further comprise an error determination section which determines whether or not a network has an error based on the numbers counted by the counting section.

(5) In the first aspect of the present invention, the information collection device may further comprise an error determination section which determines whether or not a network has an error based on the time interval counted by the counting section.

(6) The second aspect of the present invention provides a computer program capable of executing, in a computer, a signaling packet-analyzing step of extracting communication device information from a signaling packet, the communication device information identifying a communication device that transmits the signaling packet when connecting to another device.

(7) In the second aspect of the present invention, the computer program may further capable of executing a counting step of counting numbers by which the communication device transmits the signaling packet in a predetermined time, based on the communication device information and a time point extracted in the signaling packet-analyzing step.

(8) In the second aspect of the present invention, the computer program may further capable of executing a counting step of counting a time interval at which the communication device transmits the signaling packet, based on the communication device information and a time point extracted in the packet-analyzing step.

(9) In the second aspect of the present invention, the computer program may further capable of executing an error-determining step of determining whether or not a network has an error based on the numbers counted in the counting step.

(10) In the second aspect of the present invention, the computer program may further capable of executing an error-determining step of determining whether or not a network has an error based on the time interval counted in the counting step.

The present invention also provides an information collection device that includes a signaling packet analysis section which extracts communication device information from a signaling packet, the communication device information identifying a communication device that transmits the signaling packet when connecting to another device; and a counting section which counts a time interval at which the communication device transmits the signaling packet, based on the communication device information and a time point extracted by the signaling packet analysis section.

The present invention also provides a communication error detection device that includes a signaling packet analysis section which extracts communication device information from a signaling packet, the communication device information identifying a communication device that transmits the signaling packet when connecting to another device; a counting section which counts numbers by which the communication device transmits the signaling packet in a predetermined time, based on the communication device information and a time point extracted by the signaling packet analysis section; and an error determination section which determines whether or not a network has an error based on the numbers counted by the counting section.

The present invention also provides an information collection device that includes a signaling packet analysis section which extracts communication device information from a signaling packet, the communication device information identifying a communication device that transmits the signaling packet when connecting to another device; a counting section which counts a time interval at which the communication device transmits the signaling packet, based on the communication device information and a time point extracted by the signaling packet analysis section; and an error determination section which determines whether or not a network has an error based on the time interval counted by the counting section.

The present invention also provides a computer program capable of executing, in a computer, a signaling packet-analyzing step of extracting communication device information from a signaling packet, the communication device information identifying a communication device that transmits the signaling packet when connecting to another device; and a counting step of counting numbers by which the communication device transmits the signaling packet in a predetermined time, based on the communication device information and a time point extracted in the signaling packet-analyzing step.

The present invention also provides a computer program capable of executing, in a computer, a signaling packet-analyzing step of extracting communication device information from a signaling packet, the communication device information identifying a communication device that transmits the signaling packet when connecting to another device; and a counting step of counting a time interval at which the communication device transmits the signaling packet, based on the communication device information and a time point extracted in the packet-analyzing step.

The present invention also provides a computer program capable of executing, in a computer, a signaling packet-analyzing step of extracting communication device information from a signaling packet, the communication device information identifying a communication device that transmits the signaling packet when connecting to another device; a counting step of counting numbers by which the communication device transmits the signaling packet in a predetermined time, based on the communication device information and a time point extracted in the signaling packet-analyzing step; and an error-determining step of determining whether or not a network has an error based on the numbers counted in the counting step.

The present invention also provides a computer program capable of executing, in a computer, a signaling packet-analyzing step of extracting communication device information from a signaling packet, the communication device information identifying a communication device that transmits the signaling packet when connecting to another device; a counting step of counting a time interval at which the communication device transmits the signaling packet, based on the communication device information and a time point extracted in the signaling packet-analyzing step; and an error-determining step of determining whether or not a network has an error based on the time interval counted in the counting step.

Effect of the Invention

According to the present invention, it is possible to reduce introduction costs and collect information which a communication error can be more accurately determined when compared to a device that monitors an increase/decrease in the amount of traffic.

BRIEF DESCRIPTION OF THE DRAWINGS

FIG. 9 is a view illustrating a packet format of a Mobile IP Registration Request.

FIG. 10 is a view illustrating a packet format of a RADIUS Access Request.

FIG. 19 is a view illustrating an example of a DNS Query message according to the embodiment of the present invention.

REFERENCE SYMBOLS

1: INFORMATION COLLECTION DEVICE
2: SERVER
3, 79, 115, 135: USER TERMINAL (MOBILE PHONE)
10: CAPTURE NETWORK INTERFACE SECTION
11: PACKET CAPTURE SECTION
12: SIGNALING PACKET ANALYSIS SECTION
13, 23: COUNTING SECTION
14, 24: DISPLAY SECTION
21: COMMUNICATION NETWORK INTERFACE SECTION
22: COLLECTION INTERFACE SECTION
31: ERROR DETERMINATION SECTION
71, 114: BASE STATION
72, 111: PDSN
73: RADIUS SERVER
74, 112: HOME AGENT (HA)
75: Web SERVER
76: MAIL SERVER
77: ENTERPRISE NETWORK
78: INTERNET
113, 136: NETWORK SWITCH
121, 122, 131, 132: COMMUNICATION PROVIDER NETWORK
123: SIP SERVER A
124: SIP SERVER B
125: TERMINAL A
126: TERMINAL B
133: DNS SERVER A
134: DNS SERVER B

BEST MODE FOR CARRYING OUT THE INVENTION

Figure 2:
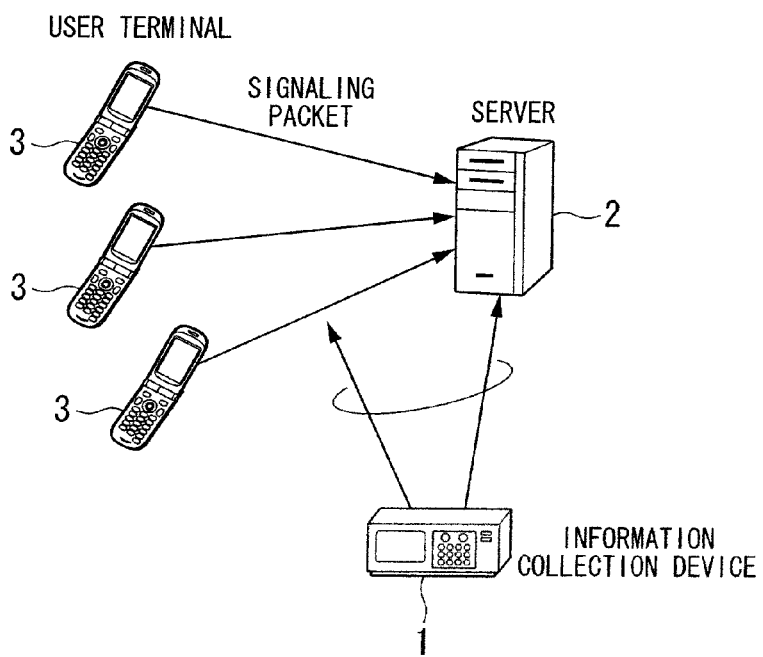
FIG. 2 is a configuration view illustrating the configuration of a network according to the embodiment of the present invention.

Hereinafter, an embodiment of the present invention will be described with reference to the accompanying drawings. FIG. 2 is a configuration view illustrating the configuration of a communication system according to an embodiment of the present invention. In the shown example, the configuration of the communication system includes an information collection device 1, a server 2, and user terminals 3. The server 2 and the user terminals 3 are connected to each other on a network. The server 2 performs a signaling process. The information collection device 1 collects signaling packets that the user terminals 3 transmit. The signaling packets are transmitted from the user terminals 3 to the server 2 according to user behaviors, and include information that identifies the user terminals 3. In addition, the information collection device 1 collects such signal packets on the network by capturing them. Thereby, the information collection device 1 can measure the number of call requests or the call request interval in a user unit, or using the Simple Network Management Protocol (SNMP) or the like, collect the result by counting the call request intervals or the number of call requests in the user unit or information necessary for the counting from the server 2. In addition, the information collection device 1 analyzes the collected signaling packets, and using the result of the analysis of the packets or information acquired from the server 2, counts the call request intervals or the number of call requests. Here, the signaling packets supposed to be analyzed correspond to the following cases. (1) In the case of a call connection request message, a user terminal 3 of a connection source transmits a signaling packet to the server 2 when the user terminal 3 is attempting to connect to a user terminal 3 in a different connected area via the server 2. The server 2 establishes a session between the user terminal 3 of the connection source and the user terminal 3 of the connected area. The user terminal 3 transmits and receives data to and from the user terminal 3. (2) In the case of a request message to a server, the user terminal 3 transmits an information or connection request message to the server 2. The server 2 transmits requested information as a reply or allows a connection to the user terminal 3.

Figure 1:
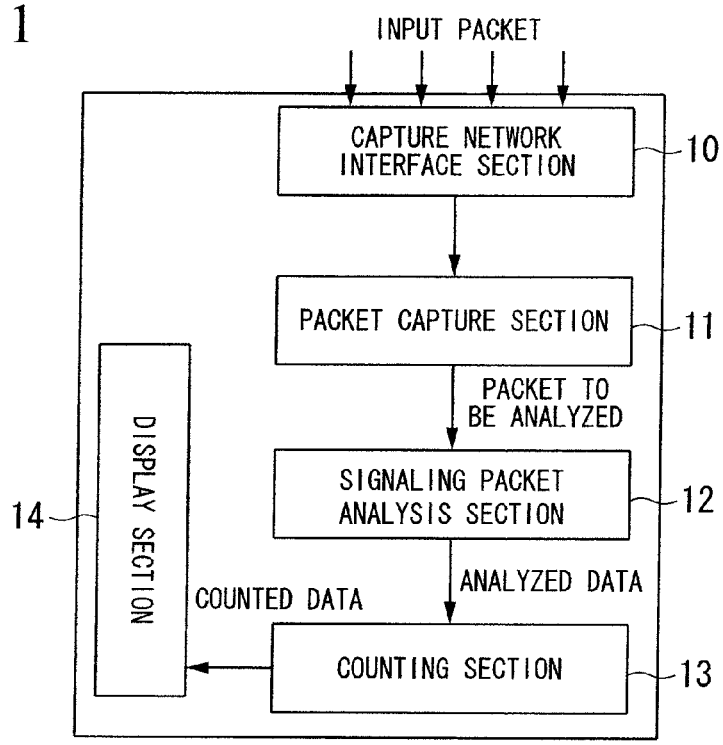
FIG. 1 is a configuration view illustrating the configuration of an information collection device according to an embodiment of the present invention.

Next, the configuration of the information collection device 1 according to an embodiment of the present invention will be described with reference to FIG. 1. FIG. 1 is a configuration view illustrating the configuration of the information collection device 1 according to an embodiment of the present invention. The information collection device 1 includes a capture network interface section 10, a packet capture section 11, a signaling packet analysis section 12, a counting section 13, and a display section 14.

The packet capture section 11 collects packets through the capture network interface section 10, and extracts signaling packets from the collected packets. As an extraction method, the packet capture section 11 extracts only the signaling packets by analyzing headers of the packets. The packet capture section 11 stores the extracted signaling packets in memory, which is not shown, by adding time information to the extracted signaling packets.

The signaling packet analysis section 12 reads the signaling packets from the memory, and extracts terminal information identifying the user terminals, which transmitted the signaling packets, and time information added by the packet capture section 11 from the signaling packets. The signaling packet analysis section 12 stores extracted terminal information and the time information into the memory by relating the terminal information to the time information.

The counting section 13 reads the terminal information and the time information from the memory, and counts the number of call connections per unit time for each user terminal. Specifically, for the time information of each user terminal identified by the terminal information, the counting section 13 determines whether or not a time point indicated by the time information is included in a predetermined unit time. Afterwards, the counting section 13 calculates the number of time points included in the predetermined unit time. This number is the number of call connections in the predetermined unit time. The counting section 13 performs the calculation for each user terminal and each unit time, and generates information that relates the identification information, the terminal information of each unit time, and the number of call connections to each other.

The counting section 13 also counts the number of user terminals, which recorded a predetermined number of call connections, per unit time based on the information, which is generated as above, generates information that relates the identification information, the number of call connections of unit time, and the number of terminals, and stores the generated information in the memory to each other.

In addition, the counting section 13 can read the terminal information and time information from the memory, and count the call connection interval per unit time for each user terminal. Specifically, the counting section 13 primarily determines whether or not a time point represented by the time information of each user terminal, identified by the terminal information, is included in a certain unit time. Next, the counting section 13 calculates the difference between a certain time point included in the certain unit time and a time point just before the certain time point. This difference is the call connection interval in the unit time. The counting section 13 performs the calculation with respect to each user terminal and each unit time, and generates information that relates the identification information, a terminal information and a call connection interval of each unit time.

The counting section 13 also counts the number of certain call connection intervals per unit time based on the information, which is generated as above, generates information that relates the identification information and call connection intervals of each unit time to the number of call connections, and stores the generated information in the memory.

The display section 14 displays information that the counting section 13 stored in the memory.

Next, with reference to FIGS. 3 to 6, a description will be given of a method for detecting a network error based on information, which is acquired and counted by the information collection device 1 according to an embodiment of the present invention. Although the signaling message is described herein as the call connection request message, the same determination can be made in the case of a request message toward the server. Generally, in a communication system, when a user is attempting to access the communication system using a terminal, if the terminal cannot access a server, which is a destination connected area, the user frequently operates the terminal device and repeats the connection process.

For example, in a mobile phone packet network, a mobile phone user attempts to access a destination server by pressing a call connection button of a mobile phone and, if the attempt to access the destination server fails, frequently repeats a call connection operation by pressing the call connection button again after pressing a call stop button. The reconnection operation is performed by the mobile phone user when the wireless environment is bad. However, when a failure is occurring in the mobile phone packet network, the number of mobile phones, on which the reconnection operation is being performed, is greater than when the wireless environment is bad. That is, when a failure occurs in the mobile phone packet network, the number of call connections of each user terminal per unit time increases, and the call connection interval of each user terminal decreases.

Figure 3:
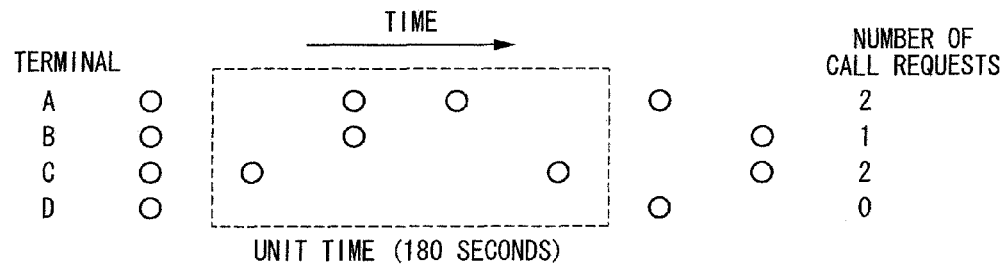
FIG. 3 is a view illustrating an example of the number of call connections per unit time according to the embodiment of the present invention.

FIG. 3 is a view illustrating an example of the number of call connections per unit time according to an embodiment of the present invention. In the shown example, a user terminal A, a user terminal B, a user terminal C, and a user terminal D are provided. Circles marked next to each user terminals indicate timings in which the user terminal performed call connections. The horizontal axis indicates time. In this embodiment, a certain unit time is set, and the frequency of call connections (i.e., the number of call connections) in the unit time is calculated. In addition, the unit time can be set to any length of time, and in FIG. 3, is set to, for example, 180 seconds. In the shown example, unit time is indicated with dashed lines.

In the shown example, in the unit time of 180 seconds, the user terminal A performed call connections two times, the user terminal B performed a call connection one time, the user terminal C performed call connections two times, and the user terminal D performed no call connection. Therefore, in the four user terminals, one terminal performed no call connection, one user terminal performed one call connection, and two user terminals performed two call connections. When converted into ratios, the number of user terminals having no call connection is 25% of the total number of user terminals, the number of user terminals having one call connection is 25% of the total number of user terminals, and the number of user terminals having two call connections is 50% of the total number of user terminals. In this embodiment, an operator such as a network operator can recognize a network error by monitoring the ratios of the user terminals, counted by respective numbers of call connections, the ratios being displayed by the information collection device 1.

Figure 4:
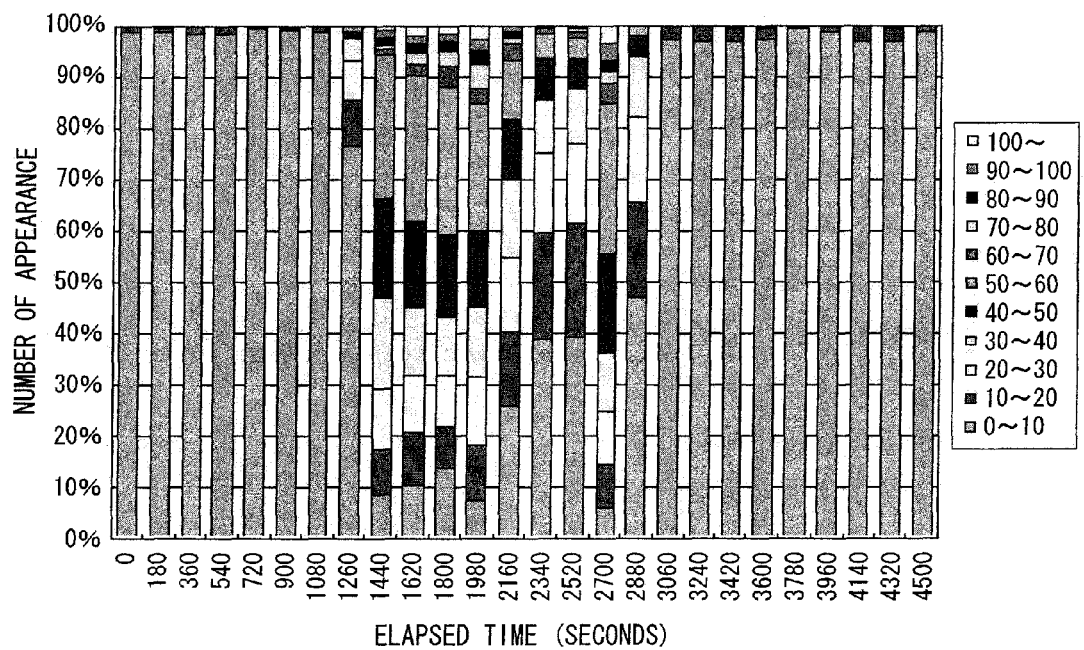
FIG. 4 is a view illustrating the ratios of user terminals, counted by the numbers of call connections per unit time according to the embodiment of the present invention.

A detailed method for finding a network error will be described with reference to FIG. 4. FIG. 4 is a view illustrating the ratios of user terminals, counted the numbers of call connections per unit time according to an embodiment of the present invention. The horizontal axis indicates elapsed time, and the vertical axis indicates the ratio of the number of the user terminals. The unit time is 180 seconds. The numbers of call connections per unit time are discriminated into 11 types, including 0 to 10 times, 11 to 20 times, 21 to 30 times, . . . , 91 to 100 times, and more than 100 times.

The ratios of the numbers of user terminals belonging to respective types are shown in the figure. In the shown example, the ratio of the number of user terminals, which have call connections 0 to 10 times in an elapsed time from 0 to 180 seconds, is 98%. Like the elapsed time from 0 to 180 seconds, the ratio of the number of user terminals, which have call connections 0 to 10 times in an elapsed time from 0 to 1260 seconds, is about 98%. The ratio of the number of user terminals, which have call connections 0 to 10 times in an elapsed time from 1260 to 1440 seconds, is 77%, and thus the ratio of user terminals, which have call connections 11 times or more per unit time, increases to 23%. The ratio of the number of user terminals, which have call connections 0 to 10 times in an elapsed time from 1440 to 1620 seconds, is 8%, and thus the ratio of user terminals, which have call connections 11 times or more per unit time, increases to 92%. Below, the ratios of the numbers of user terminals, counted at each number of call connections per unit time in the same manner, can be understood from the figure.

In the example shown in FIG. 4, the ratio of the number of user terminals, which have 11 call connections or more per unit time, increases from a certain elapsed time in the vicinity of 1260 seconds. In addition, the ratio of the number of user terminals, which have 11 call connections or more per unit time, decreases from a certain elapsed time in the vicinity of 3060 seconds. From the above, it can be understood that a failure in the mobile phone packet network occurs in the vicinity of an elapsed time of 1260 seconds and begins to recover in the vicinity of an elapsed time of 3060.

Figure 5:
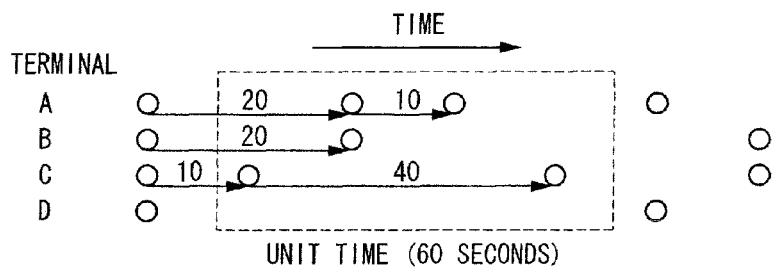
FIG. 5 is a view illustrating an example of a call connection interval per unit time according to the embodiment of the present invention.

FIG. 5 is a view illustrating an example of a call connection interval per unit time according to an embodiment of the present invention. In the shown example, a user terminal A, a user terminal B, a user terminal C, and a user terminal D are provided.

The horizontal axis indicates time. Unit time is part of the horizontal time axis. Circles marked next to each user terminal indicate timings in which the user terminal performed call connections. In addition, arrows extending from one circle to another indicate call connection intervals. In the shown example, unit time is indicated with dashed lines. In addition, the unit time can be set to any length of time, and in FIG. 5, is set to, for example, 60 seconds.

In the shown example, the user terminal A performed call connections two times in a unit time of 60 seconds, with call connection intervals of 20 and 10 seconds from previous call connections. The user terminal B performed a call connection one time in the unit time of 60 seconds, with a call connection interval of 20 seconds from a previous call connection. The user terminal C performed call connections two times in the unit time of 60 seconds, with call connection intervals of 10 and 40 seconds from previous call connections. The user terminal D performed no call connection in the unit time of 60 seconds. Therefore, in the unit time of 60 seconds, the number of call connections performed with a call connection interval of 10 seconds from previous call connections is 2, the number of call connections performed with a call connection interval of 20 seconds from previous call connections is 2, and the number of call connections performed with a call connection interval of 40 seconds from previous call connections is 1.

The above can be converted into ratios. The number of call connections performed with a call connection interval of 10 seconds from previous call connections is 40% of the total number of call connections in the unit time of 60 seconds, the number of call connections performed with a call connection interval of 20 seconds from previous call connections is 40% of the total number of call connections in the unit time of 60 seconds, and the number of call connections performed with a call connection interval of 40 seconds from previous call connections is 20% of the total number of call connections in the unit time of 60 seconds. In this embodiment, an operator such as a network operator can recognize a network error by monitoring the ratios of the number of call connections, counted at each call connection interval between the call connections and previous call connections that the information collection device 1 displays.

Figure 6:
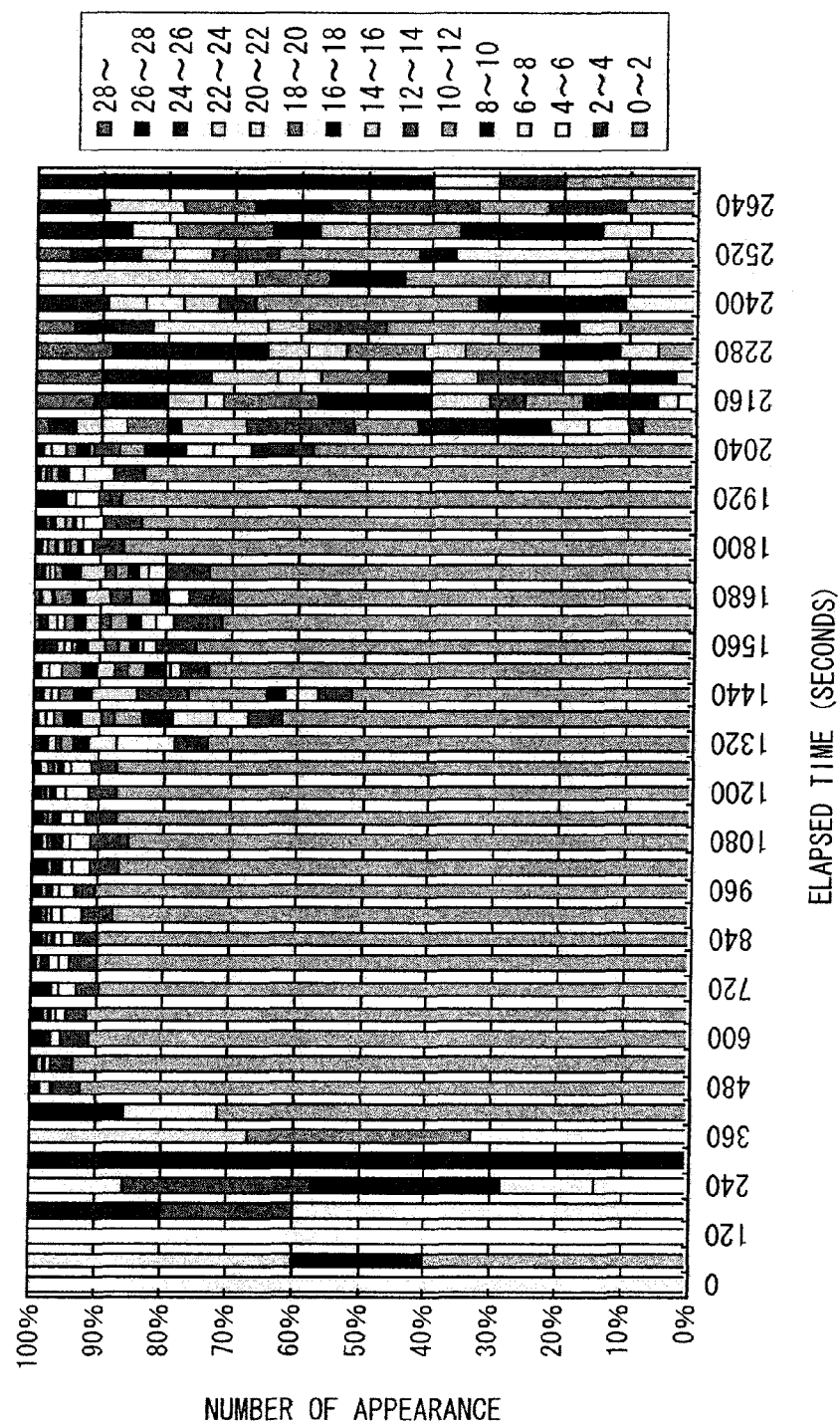
FIG. 6 is a view illustrating the ratios of the numbers of call connections counted at intervals between the call connections and previous call connections per unit time according to the embodiment of the present invention.

Below, with reference to FIG. 6, a description will be given of a detailed method for determining a network error. FIG. 6 is a view illustrating the ratios of the numbers of call connections counted at intervals between the call connections and previous call connections per unit time. The horizontal axis indicates elapsed time, and vertical axis indicates the ratios of the numbers of call connections. The unit time is 60 seconds. The intervals of call connections are discriminated into 15 types, including 0 to 2 seconds, 2 to 4 seconds, 4 to 8 seconds, . . . , 26 to 28 seconds, and 28 seconds and more. The ratios of the intervals of call connections belonging to respective types are shown in the figure.

In the shown example, the ratio of call connections with a call connection interval from 0 to 2 seconds in an elapsed time from 0 to 60 seconds is 0%, and the ratio of call connections with a call connection interval from 0 to 2 seconds in an elapsed time from 60 to 120 seconds is 40%. Like the elapsed time from 0 to 180 seconds, in a unit time in an elapsed time from 120 to 420 seconds, the ratio of call connections with a call connection interval from 0 to 2 seconds is 0%. In an elapsed time from 420 to 2100 seconds, the ratio of call connections with a call connection interval from 0 to 2 seconds is 50% or more. Below, the ratios of the numbers of call connections, counted at each call connection interval between the call connections and previous call connections per unit time in the same manner, can be appreciated from FIG. 6.

In the example shown in FIG. 6, the ratio of call connections, the call connection interval of which is 0 to 2 seconds per unit time, increases from a certain elapsed time in the vicinity of 420 seconds. In addition, the ratio of call connections, the call connection interval of which is 0 to 2 seconds per unit time, decreases from a certain elapsed time in the vicinity of 2100 seconds. From the above, it can be understood that a failure in the mobile phone packet network occurs in the vicinity of an elapsed time of 420 seconds and begins to recover in the vicinity of an elapsed time of 2100.

As described above, it is possible to detect a failure occurred in the communication provider network by referring to the number of call connections or call connection intervals per unit time, accounted by the information collection device 1 of this embodiment. In addition, the information collection device 1 may count the number of call connections per unit time, count call connection intervals per unit time, or count both the number of call connections and the call connection intervals per unit time.

In addition, although the packet capture section 11 adds time information with respect to the signaling packet in this embodiment, the time information can be added by another device. For example, the user terminal can add a transmission time as time information to a signaling packet, or the server that transmits the packet can add a time point, at which the packet is transmitted, as time information to the packet. In addition, for example, the time information can be a relative time point based on a certain time point.

Figure 7:
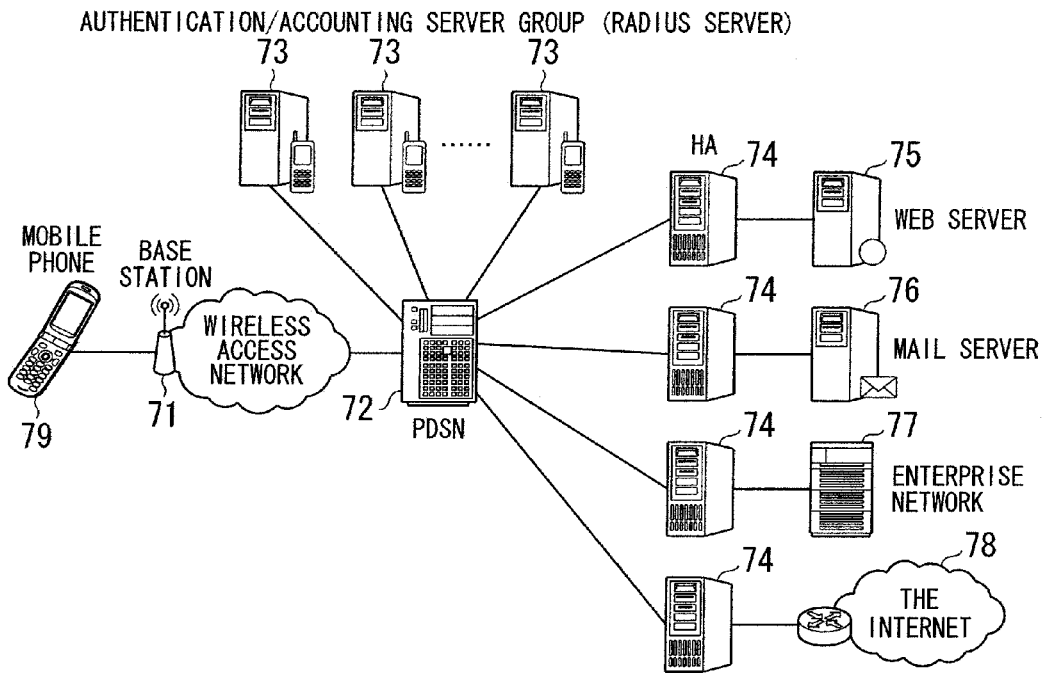
FIG. 7 is a configuration view illustrating a mobile phone packet network according to the embodiment of the present invention.
Figure 8:
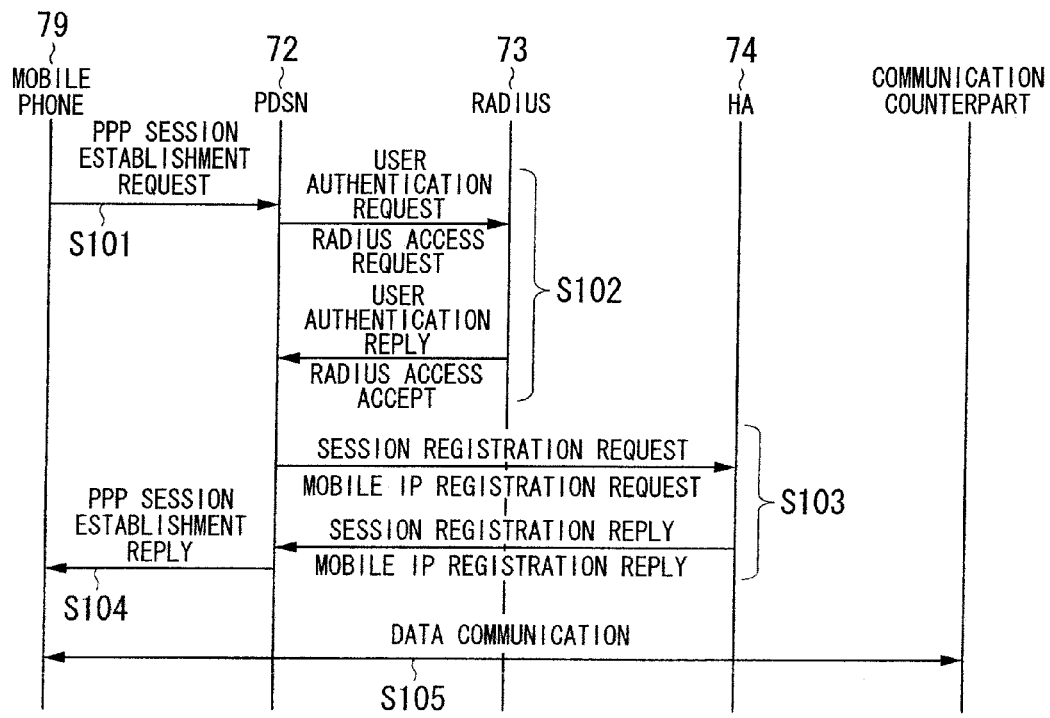
FIG. 8 is a sequence diagram illustrating a process of performing an IP packet communication from a mobile phone according to the embodiment of the present invention.

Below, with reference to FIGS. 7 and 8, a description will be given of an example of a signaling packet acquired by the information collection device 1 according to an embodiment of the present invention. FIG. 7 is a configuration view illustrating a mobile phone packet network according to an embodiment of the present invention. The mobile phone packet network includes base stations 71, a Packet Data Serving Node (PDSN) 72, a Remote Authentication Dial In User Service (RADIUS) server 73, and Home Agents (HAs) 74. In addition, the mobile phone packet network is connected to a Web server 75, which provides a Web service, a mail server 76, which provides a mailing service, an enterprise network 77, the Internet 78, and the like via the HAs 74. The HAs 74 are prepared for the respective connection services. A plurality of base stations 71 are scattered over various places, the PDSN 72, the HAs 74, and the RADIUS server 73 are generally installed inside a station building of a communication provider. In addition, a mobile phone (i.e., user terminal) 79 is connected to the base station 71 via wireless communication. The base station 71 is connected to the PDSN 72 via a wireless access network. The PDSN 72 performs accounting or authentication on the mobile phone 79. The RADIUS server 73 is connected to the PDSN 72, and manages the accounting or authentication performed on the mobile phone 79.

Below, with reference to FIG. 8, a description will be given of a process of performing an IP packet communication from a mobile phone. FIG. 8 is a sequence diagram illustrating a process of performing an IP packet communication from a mobile phone according to an embodiment of the present invention.

(Step S101) The mobile phone 79 transmits a Point-to-Point (PPP) session establishment request message to the PDSN 72. The PPP session establishment request message includes a user name, a password, available services, and mobile phone numbers.

(Step S102) The PDSN 72 performs user authentication by inquiring to the RADIUS server 73 whether or not the user name and the password in the PPP session establishment request message transmitted from the mobile phone 79 are valid. The user authentication is performed by the PDSN 72 transmitting a RADIUS packet of a "Radius Access Request" to the RADIUS server 73 and by the RADIUS server 73 transmitting a RADIUS packet of a "Radius Access Accept" to the PDSN 72.

(Step S103) The PDSN 72 performs session registration based on available service information in the PPP session establishment request message transmitted from the mobile phone 79. The session registration is performed by the PDSN 72 transmitting a mobile IP packet of a "Mobile IP Registration Request" to the HAs 74, which provides an available service included in the PPP session establishment request message, and by the HA 74, upon receiving the mobile IP packet, transmitting a mobile IP packet of a "Mobile IP Registration Reply" to the PDSN 72. In addition, the mobile IP packet of a "Mobile IP Registration Request" includes a service name, authentication information, and terminal information.

(Step S104) The PDSN 72 notifies the mobile phone 79 that the PPP session is established.

(Step S105) The mobile phone 79 performs data communication with a communication counterpart using IP packets. The above described is the call connection process.

Below, a description will be given of a method of acquiring the number of call connections and call connection intervals. In this embodiment, the call connection information of a user terminal is acquired by analyzing a signaling packet related to a call connection process.

In the call connection process illustrated with reference to FIG. 7, the signaling packets are three messages such as a PPP session establishment request message, Radius Access Request, and Mobile IP Registration Request. As described above, the three signaling packets include information for the authentication of a user, information for the identification of a user terminal, and information of available services. Accordingly, it is possible to acquire call connection information representing the number of call connections and call connection intervals in a user terminal unit by analyzing such signaling packets. In addition, when acquiring the call connection information, it is possible to use all of the three signaling messages such as the PPP session establishment request message, Radius Access Request, and Mobile IP Registration Request or to use one or two of the three signaling messages.

Below, with reference to FIG. 9, a description will be given of a packet format of a detailed Mobile IP Registration Request. FIG. 9 is a view illustrating a packet format of a Mobile IP Registration Request. As shown in the figure, the Mobile IP Registration Request generally includes a Mobile Node NAI Extension. As shown in the figure, NAI is included in MN-NAI of the Mobile Node NAI Extension. NAI is generally expressed in the form of USER@domain, in which a user terminal can be identified from "USER" and the service can be identified from "domain." In addition, the user terminal can also be identified by the home address of a mobile IP that represents the IP address of the terminal on the home network.

Below, with reference to FIG. 10, a description will be given of a packet format of a detailed Radius Access Request. FIG. 10 is a view illustrating a packet format of a Radius Access Request. As shown in the figure, a Radius Access Request includes Attribute Value Pair (AVP) since it indicates a user name or terminal numbers. Calling Station ID represents the identifier of the terminal, and User-Name represents a user name, generally, in the form of USER@domain. When User-Name is in the form of USER@domain, as in the Mobile IP Registration Request, the user terminal can be identified from "USER," and the service can be identified from "domain." In addition, all values of Calling Station ID and User-Name are included in String parts.

Figure 11:
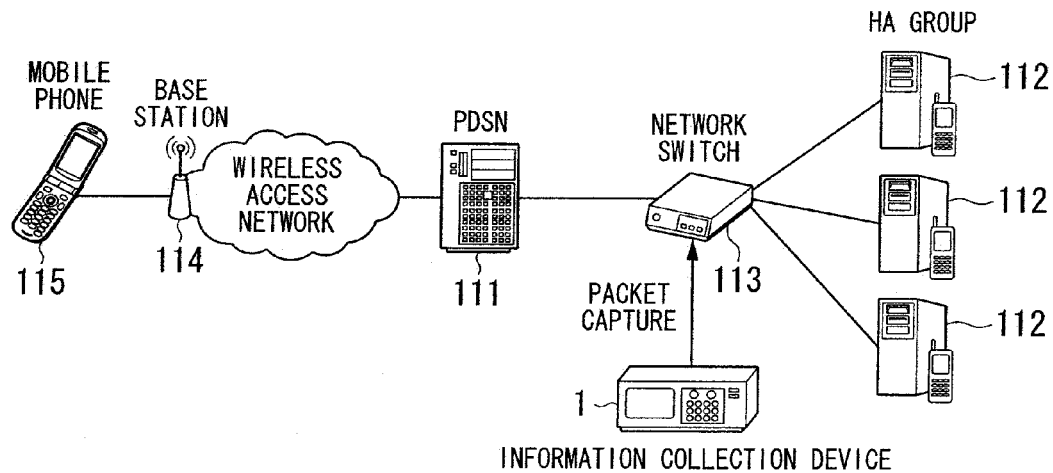
FIG. 11 is a view illustrating the configuration in which an information collection device 1 according to the embodiment of the present invention is connected to a communication system.

Below, with reference to FIG. 11, a description will be given of an example in which the information collection device 1 of this embodiment is installed in a communication system, the signaling packet of which is supposed to be collected. FIG. 11 is a view illustrating the configuration in which the information collection device 1 of this embodiment is connected to the communication system. In the shown example, the communication system includes a PDSN 111, HAs 112, a network switch 113, a base station 114, and a user terminal 115. In addition, the HAs 112 can be replaced by RADIUS servers.

The PDSN 111 and the HAs 112 are connected to the network switch 113. The information collection device 1 is connected to the switch to which the PDSN 111 and the HAs 112 are connected. In the shown example, at the network switch 113, the information collection device 1 collects packets transmitted from the user terminal 115 through the PDSN 111 to the HAs 112, using a scheme such as port mirroring. In addition, the packet collecting method includes a plurality of schemes, one of which is referred to as physically (electrically or optically) diverging TAP. The method of this embodiment can employ such schemes. In addition, the information collection device 1 acquires the number of call connections or call connection intervals of the respective user terminals 115 by analyzing the collected packets.

The call connection information of the user terminal (mobile terminal) can be acquired from a plurality of places such as a base station. However, as described above, it is possible to acquire the call connection information of the user terminal (i.e., mobile terminal) by installing the information collection device 1 on only one position of the communication system when the information collection device 1 is connected to the network switch 113.

Figure 12:
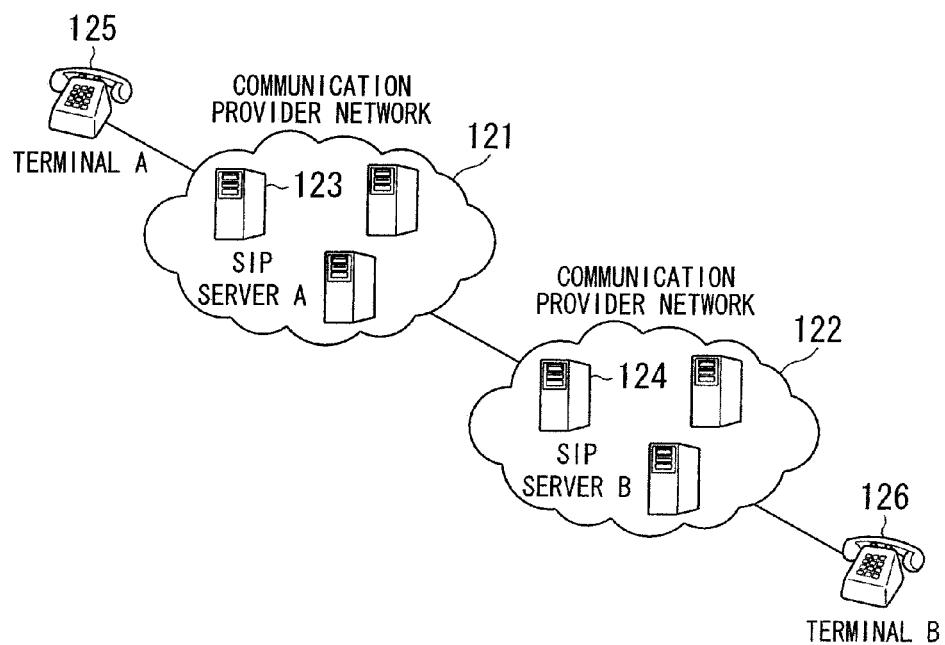
FIG. 12 is a configuration view illustrating the configuration of a network having an SIP server according to the embodiment of the present invention.

While the mobile phone packet network of a communication provider has been described by way of an example, the information collection device 1 of this embodiment can be applied to a communication network in which a signaling packet is transmitted when the user terminal starts accessing another device. For example, with reference to FIG. 12, a description will be given of, for example, a network having a Session Initiation Protocol (SIP) server used for IP phones. FIG. 12 is a configuration view illustrating the configuration of a network having an SIP server according to an embodiment of the present invention. In the shown example, a communication provider network 121 and a communication provider network 122 are connected to each other. The communication provider network 121 includes an SIP server A 123. The communication provider network 122 includes an SIP server B 124. A terminal A 125 is connected to the communication provider network 121, and a terminal B 126 is connected to the communication provider network 122.

Figures 13, 14:
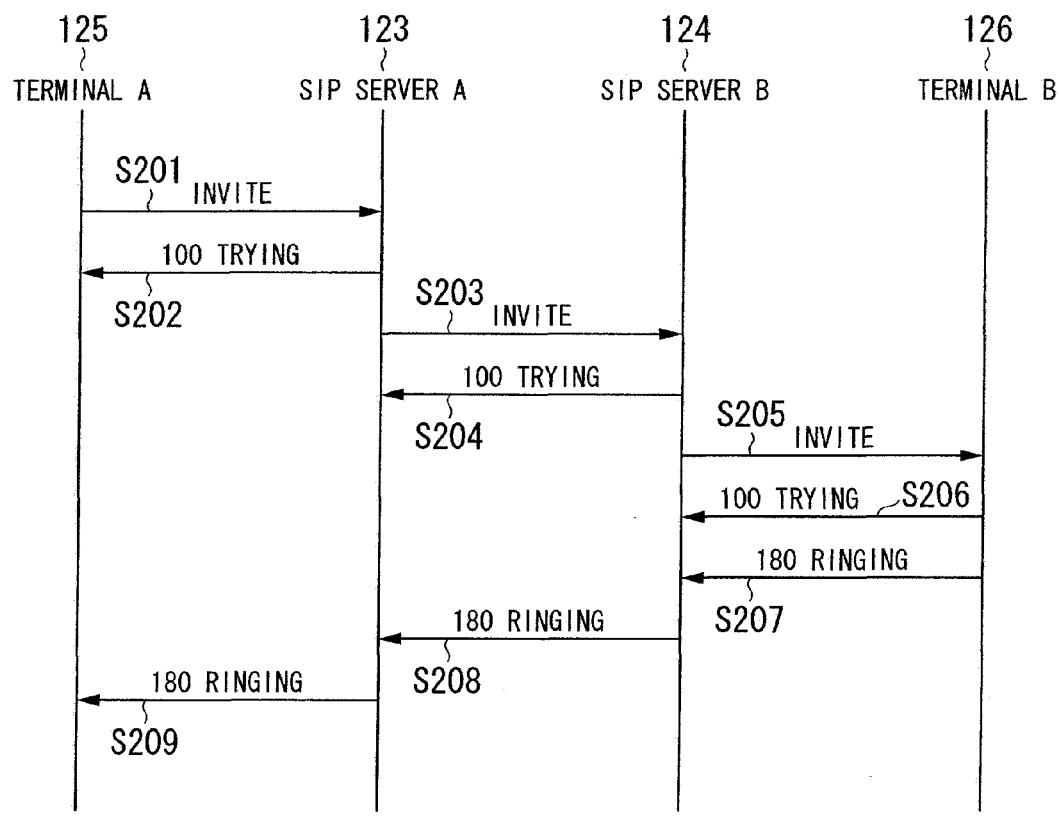
FIG. 13 is a sequence diagram illustrating a process of performing a call connection from a terminal A to a terminal B according to the embodiment of the present invention.
FIG. 14 is a view illustrating an example of an INVITE message according to the embodiment of the present invention.

Below, with reference to FIG. 13, a description will be given of a call connection process from the terminal A 125 to the terminal B 126, which is shown in FIG. 12. FIG. 13 is a sequence diagram illustrating a call connection process from a terminal A to a terminal B in this embodiment.

(Step S201) The terminal A 125 transmits an INVITE message to the SIP server A 123.

(Step S202) The SIP server A 123 transmits a Trying message to the terminal A 125.

(Step S203) The SIP server A 123 transmits an INVITE message to the SIP server B 124.

(Step S204) The SIP server B 124 transmits a Trying message to the SIP server A 123.

(Step S205) The SIP server B 124 transmits an INVITE message to the terminal B 126.

(Step S206) The terminal B 126 transmits a Trying message to the SIP server B 124.

(Step S207) The terminal B 126 transmits a Ringing message to the SIP server B 124.

(Step S208) The SIP server B transmits a Ringing message to the SIP server A.

(Step S209) The SIP server A 123 transmits a Ringing message to the terminal A 125.

As shown in the figure, in the SIP, an INVITE message is essentially transmitted from the user terminal (terminal A) whenever the user performs a call connection process using the user terminal. An example of the INVITE message is shown in FIG. 14. FIG. 14 is a view illustrating an example of an INVITE message according to an embodiment of the present invention. In the shown example, "Via" in the INVITE message, "From" in the INVITE message, or the Source IP address included in the IP header of the INVITE message can be regarded as an identifier of the user terminal. In addition, Content-Type of the INVITE message can be regarded as a service identifier. In addition, as for the service identifier, if the Session Description Protocol (SDP) used together with the SIP is included in the INVITE message, the service can be more specifically discriminated.

In addition, the INVITE message is transmitted from the user terminal to the SIP server. Accordingly, in the configuration shown in FIG. 12, the SIP server A 123 or the SIP server B 124 captures the INVITE message in packets, and acquires the number of call connections or call connection intervals of each user terminal, thereby monitoring a network error.

Figure 17:
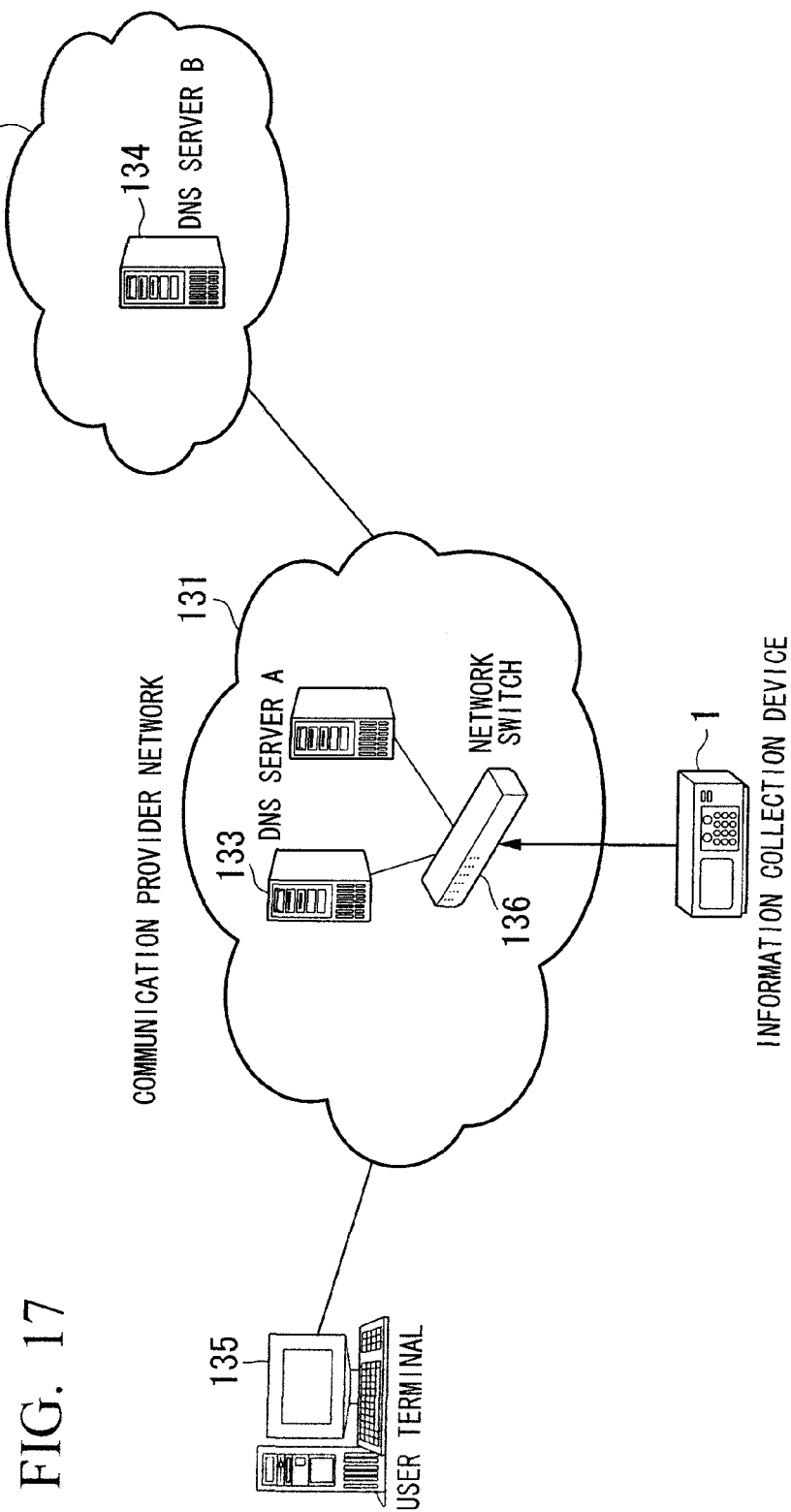
FIG. 17 is a configuration view illustrating a configuration of a network having a DNS server according to the embodiment of the present invention.

In addition, while the SIP signaling used for the mobile phone packet network and the IP phones in the communication enterprise have been illustrated so far, the information collection device 1 of this embodiment can be applied to signaling that is used when the user terminal requests information from the server or connects to the server. For example, a Domain Name System (DNS) that resolves an IP address from a host name will be described with reference to FIG. 17. FIG. 17 is a configuration view illustrating a DNS server according to an embodiment of the present invention. In the shown embodiment, a communication provider network 131 is connected with a communication provider network 132. The communication provider network 131 includes a DNS server A 133. The communication provider network 132 includes a DNS server B 134. A user terminal 135 is connected to the communication provider network 131. Here, it shall be assumed that the communication provider network 131 has a domain exampleA.jp, the communication provider network 132 has a domain exampleB.jp, the DNS server A 133 manages information on the host and IP address of the domain exampleA.jp, and the DNS server B 134 manages information on the host and IP address of the domain exampleB.jp.

In addition, it shall be assumed that the DNS server A 133 is connected to a network switch 136 inside the communication provider network 131, and the information collection device 1 can collect signaling packets using the network switch 136.

Figure 18:
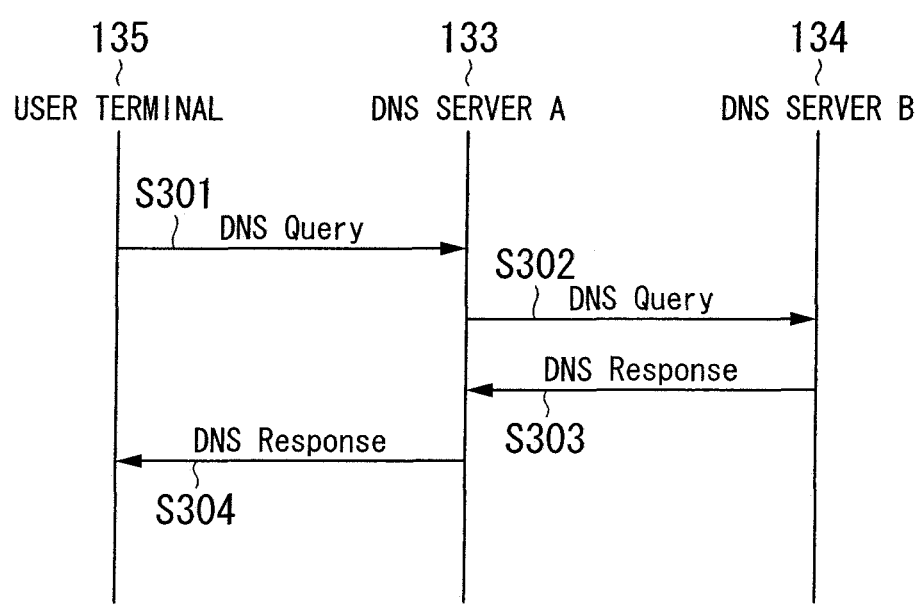
FIG. 18 is a sequence diagram illustrating a process in which a user terminal performs a name resolution using a DNS server according to the embodiment of the present invention.
Figure 20:
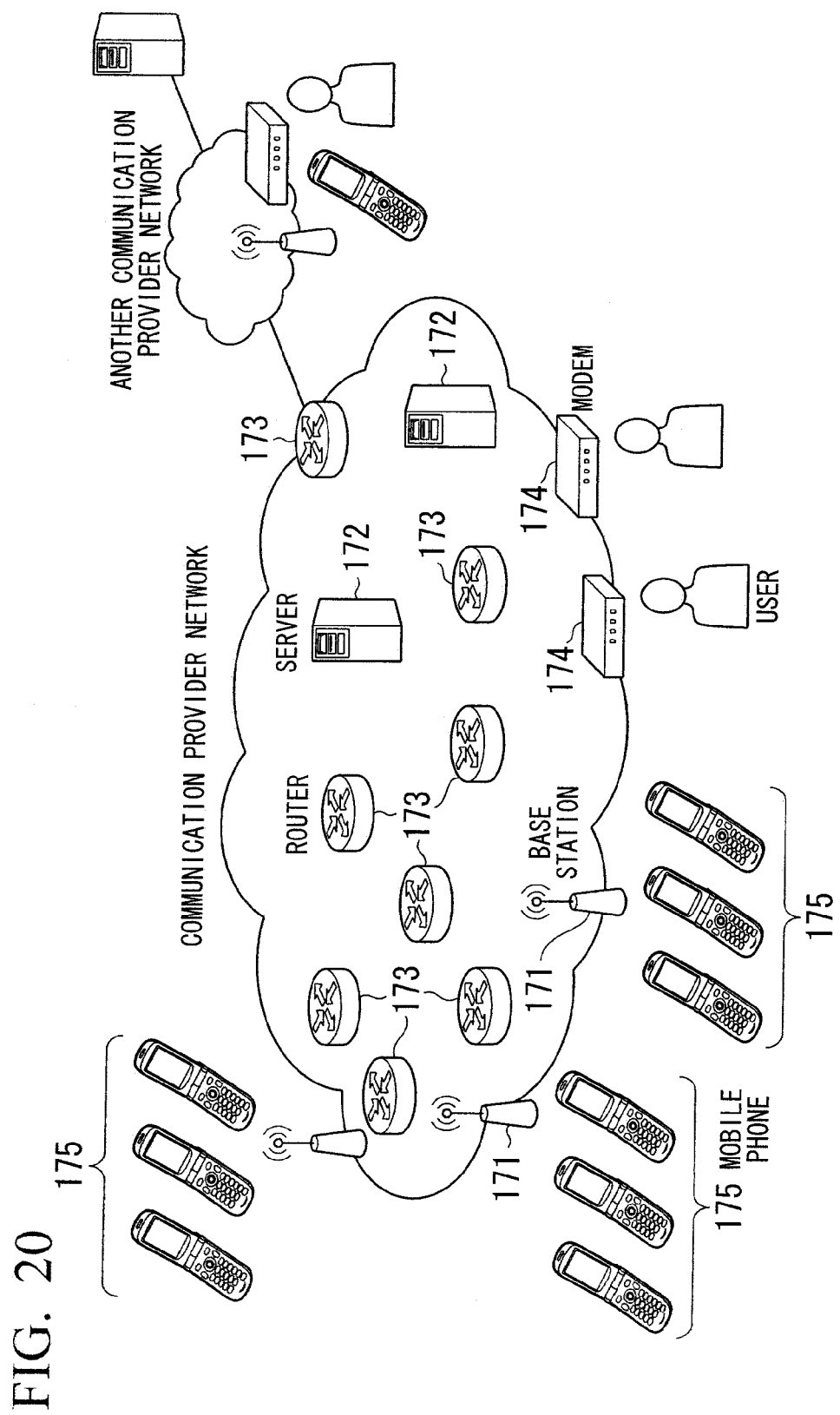
FIG. 20 is a view illustrating the configuration of a general communication provider network.

Next, with reference to FIG. 18, a description will be given of a process in which the user terminal 135 shown in FIG. 17 resolves the IP address from a host name host.exampleB.jp using the DNS. In addition, this process is generally called name resolution. FIG. 18 is a sequence diagram illustrating a process in which a user terminal resolves an IP address from a host name according to an embodiment of the present invention.

(Step S301) The user terminal 135 transmits a DNS Query to the DNS server A 133.

(Step S302) The DNS server A 133 transmits the DNS Query to the DNS server B 134.

(Step S303) The DNS server B 134 transmits a DNS Response to the DNS server A 133.

(Step S304) The DNS server A 133 transmits the DNS Response to the user terminal 135.

As shown in the figure, in the case of DNS, the DNS Query is essentially transmitted from the user terminal whenever the user resolves the IP address from the host name on the user terminal. An example of the DNS Query message is shown in FIG. 19. In addition, in FIG. 19, the Domain Name System (DNS) is a field continuing from the User Datagram Protocol (UDP), and is illustrated by a width of 16 octets for the sake of convenient description. In the shown example, the source IP address of the DNS Query can be regarded as the identifier of the user terminal. In addition, it is possible to regard the destination port number of the DNS Query message or the destination port number of a DNS message, which is being transmitted, as a service identifier.

In addition, the DNS Query message is transmitted toward the DNS server. In addition, as shown in FIG. 18, the user terminal transmits the DNS Query to the DNS server (DNS server A 133) of the network to which the user terminal belongs, and the DNS server A transmits the DNS Query to the DNS server (DNS server B 134) in which the host subjected to the name resolution is managed. Therefore, in the configuration shown in FIG. 17, it is possible to capture packets on the network of the communication provider network 131, regard the DNS Query transmission at each user terminal as signaling for call connections, and acquire the number or interval of the call connections, thereby monitoring a malfunction of the DSN server of another provider network (e.g., the communication provider network 132) or a network error.

While this embodiment has been illustrated with respect to the name resolution by the DNS, this embodiment can be applied to the case in which a request and a reply are performed using another communication protocol. As another example, 3-way Handshaking, a connection scheme based on the Transmission Control Protocol (TCP), can be used.

According to this embodiment as described above, in a network in which the user terminal performs communication by transmitting a signaling packet and adding an identifier for the identification of the user terminal to the signaling packet, when it starts access to another device, it is possible to acquire the number or interval of call connections of each user terminal, thereby monitoring a network error based on the acquired information. In addition, as the identifier for the identification of the user terminal included in the signaling packet, a piece of information such as terminal numbers, which the user terminal can determine, or an IP address of the source of transmission of the signaling packet can be included in the signaling packet.

Figure 15:
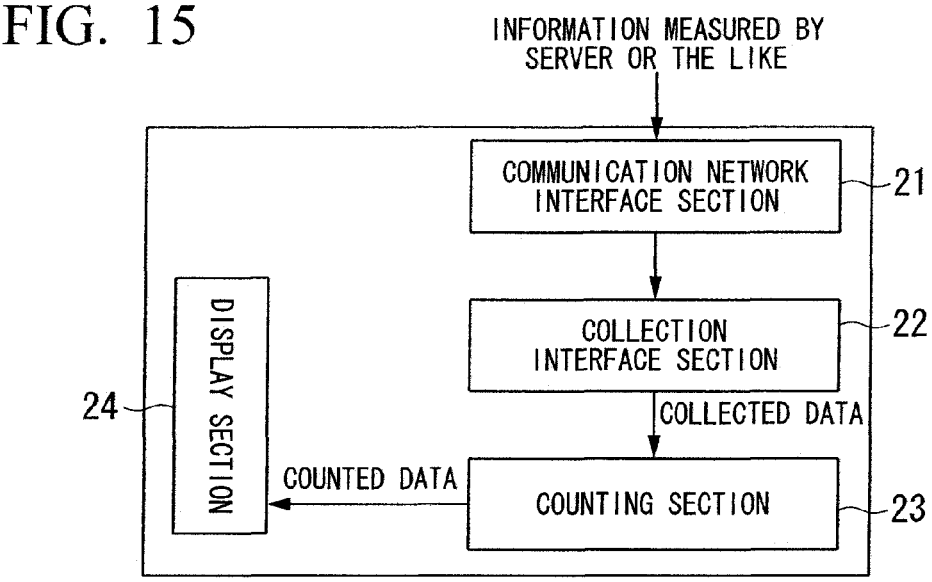
FIG. 15 is a block diagram illustrating an information collection device having a connection interface according to the embodiment of the present invention.

In addition, while the information collection device shown in FIG. 1 has the packet capture section, the collection interface section can be provided instead of the packet capture section as in the information collection device shown in FIG. 15. In this case, the collection interface section acquires data, such as the number or interval of call connections, of each user terminal using an interface such as SNMP from the PDSN, HA, RADIUS server, or the like.

FIG. 15 is a block diagram illustrating an information collection device having a collection interface according to this embodiment. The information collection device having a collection interface includes a communication network interface section 21, a collection interface section 22, a counting section 23, and a display section 24. The communication network interface section 21 is connected to a device (not shown) such as a server that transmits data, such as the number or interval of call connections, of each user terminal. The collection interface section 22 receives the data, such as the number or interval of call connections, of each user terminal via the communication network interface section 21. The counting section 23 counts the number of call connections of each user terminal per unit time based on the number of call connections of each user terminal acquired by the collection interface section 22. In addition, the counting section 23 can count the interval of call connections of each user terminal per unit time based on the number of call connections of each user terminal acquired by the collection interface section 22. The display section 24 displays the result counted by the counting section 23.

Figure 16:
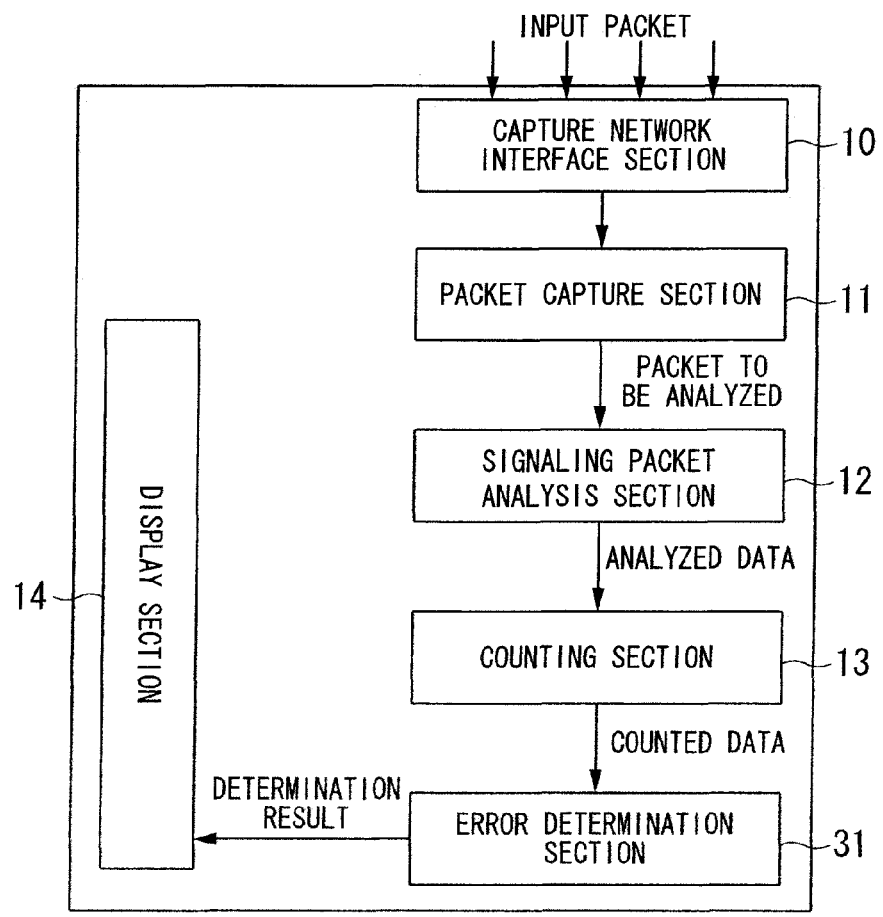
FIG. 16 is a configuration view illustrating the configuration of a communication error detection device according to the embodiment of the present invention.

In addition, the information collection device of this embodiment incorporating an error determination section therein can be provided as a communication error detection device. FIG. 16 is a configuration view illustrating the configuration of a communication error detection device according to an embodiment of the present invention. The communication error detection device 30 includes a capture network interface section 10, a packet capture section 11, a signaling packet analysis section 12, a counting section 13, an error determination section 31, and a display section 14. The capture network interface section 10, the packet capture section 11, the signaling packet analysis section 12, and the counting section 13 are the same as those of the information collection device 1. The error determination section 31 determines a network error based on the number of call connections of each user terminal, counted by the counting section 13. For example, if the ratio of user terminals, which has 40 or more call connections, exceeds 50% per unit time, the error determination section 31 determines that a network error occurred. The display section 14 displays the result determined by the error determination section 31. In addition, the error determination section 31 can determine a network error based on the number of call connections at intervals between the call connections and previous call connections, counted by the counting section 13 per unit time. For example, if the ratio of call connections per unit time, which have a call connection interval from 0 to 2 seconds, exceeds 50%, the error determination section 31 can determine a network error.

As described above, this embodiment makes it possible to acquire and analyze signaling packets, thereby collecting information for the determination of a communication error without monitoring an increase in the amount of traffic. In addition, this embodiment makes it possible to detect a communication error without monitoring an increase/decrease in the amount of traffic since the information collection device incorporates the error determination section.

In addition, if the signaling packet includes information in use for service identification, the number of call connections and call connection intervals can be counted according to services. Accordingly, it is possible to detect failures according to the services. In addition, it is also possible to acquire the number of transmitted packets according to servers such as a PDSN, an HA, and a RADIUS server or the number of packets according to the transmitted signaling types in order to analyze the signaling packets.

In addition, all or part of the capture network interface function of the information collection device or the communication error detection device in the above-described embodiment, all or part of the packet-capturing function, all or part of the signaling packet-analyzing function, all or part of the counting function, all or part of the display function, all or part of the communication network interface function, all or part of the collection interface function, and all or part of the error determination function can be realized by recording a program capable of executing such functions in a computer-readable recording medium so that a computer system can read the program recorded in the recording medium. In addition, the term "computer system" mentioned herein includes an Operating System (OS) and hardware such as peripheral devices.

In addition, the term "computer-readable recording medium" refers to portable media such as a flexible disc, a magneto-optical disc, a Read Only Memory (ROM), or a Compact Disc Read Only Memory (CD-ROM) and storage devices such as a hard disc that is internally mounted on the computer system. In addition, the term "computer-readable recording medium" can include a network such as the Internet and communication lines, such as telephone lines, which dynamically maintain the program for a short time when the program is transmitted via the communication lines, as well as a volatile memory inside the computer system, in which the computer system acts as a client and a server in such a case, and the volatile memory maintains the program for a certain time period. Furthermore, the program can be for realizing part of the foregoing functions, and additionally, for realizing the foregoing functions in combination with a program that is already recorded in the computer system.

Although the embodiments of the present invention have been described in conjunction with the drawings, detailed constructions are not limited to the foregoing embodiments but shall embrace modifications to design without departing from the spirit of the present invention.

Industrial Applicability

The present invention can be applied to an information collection device and the like that can be fabricated at an low cost and collect information based on which a communication error can be more accurately determined when compared to a device that monitors an increase/decrease in the amount of traffic.

The invention claimed is:

1. An information collection method, comprising:
extracting communication device information from a signaling packet, the communication device information identifying a communication device that transmits the signaling packet when connecting to another device;
counting a number of communication devices which transmit the signaling packet in a predetermined time, based on the extracted communication device information and a time point;
calculating a ratio of the number of communication devices which sent the signaling packet predetermined times in the predetermined time to the number of communication devices which sent the signaling packet in the predetermined time; and
determining that a network has an error if the calculated ratio is over a predetermined ratio.

2. An information collection method, comprising:
extracting communication device information from a signaling packet, the communication device information identifying a communication device that transmits the signaling packet when connecting to another device;

counting a number of communication devices which transmit the signaling packet with a predetermined time interval, based on the extracted communication device information and a time point;

calculating a ratio of the number of communication devices which sent the signaling packet with the predetermined time interval to the number of the communication devices which sent the signaling packet; and determining that a network has an error if the calculated ratio is over a predetermined ratio.

3. A non-transitory computer program executing, in a computer, the non-transitory computer program comprising:

extracting communication device information from a signaling packet, the communication device information identifying a communication device that transmits the signaling packet when connecting to another device;

counting a number of communication devices which transmit the signaling packet in a predetermined time based on the communication device information and a time point;

calculating a ratio of the number of communication devices which sent the signaling packet predetermined times in the predetermined time to the number of communication devices which sent the signaling packet in the predetermined time; and determining that a network has an error if the calculated ratio is over a predetermined ratio.

4. A non-transitory computer program executing, in a computer, the non-transitory computer program comprising:

extracting communication device information from a signaling packet, the communication device information identifying a communication device that transmits the signaling packet when connecting to another device;

counting a number of communication devices which transmit the signaling packet with a predetermined time interval, based on the extracted communication device information and a time point;

calculating a ratio of the number of communication devices which sent the signaling packet with the predetermined time interval to the number of the communication devices which sent the signaling packet; and determining that a network has an error if the calculated ratio is over a predetermined ratio.

* * * * *